(12) United States Patent
Lobovsky et al.

(10) Patent No.: US 6,682,677 B2
(45) Date of Patent: Jan. 27, 2004

(54) SPINNING, PROCESSING, AND APPLICATIONS OF CARBON NANOTUBE FILAMENTS, RIBBONS, AND YARNS

(75) Inventors: Alex Lobovsky, New Providence, NJ (US); Jim Matrunich, Mountainside, NJ (US); Mikhail Kozlov, Eatontown, NJ (US); Robert C. Morris, Flanders, NJ (US); Ray H. Baughman, Dallas, TX (US); Anvar A. Zakhidov, Mckinney, TX (US)

(73) Assignee: Honeywell International Inc., Morristown, NJ (US)

( * ) Notice: Subject to any disclaimer, the term of this patent is extended or adjusted under 35 U.S.C. 154(b) by 51 days.

(21) Appl. No.: 09/946,432

(22) Filed: Sep. 4, 2001

(65) Prior Publication Data

US 2002/0113335 A1 Aug. 22, 2002

Related U.S. Application Data

(60) Provisional application No. 60/245,161, filed on Nov. 3, 2000.

(51) Int. Cl.$^7$ .............................. D01D 5/28; D01F 9/12
(52) U.S. Cl. ............................. 264/172.11; 264/172.16; 264/211.12; 264/346; 264/11; 423/447.1
(58) Field of Search ...................... 264/172.11, 172.16, 264/211.12, 346, 433, 11; 423/447.1, 447.2

(56) References Cited

U.S. PATENT DOCUMENTS

| | | | | |
|---|---|---|---|---|
| 2,510,135 A | 6/1950 | Pedlow et al. | ................. | 18/54 |
| 3,382,535 A | 5/1968 | Ferrari | | |
| 4,015,924 A | 4/1977 | LaNieve | .................... | 425/455 |
| 6,031,711 A | 2/2000 | Tennent et al. | ............. | 361/303 |
| 6,299,812 B1 | * 10/2001 | Newman et al. | ......... | 264/176.1 |

FOREIGN PATENT DOCUMENTS

| | | |
|---|---|---|
| EP | 0442405 A2 | 8/1991 |
| WO | WO 0017102 A1 | 3/2000 |
| WO | WO 0026138 A1 | 5/2000 |
| WO | WO 0163028 A1 | 8/2001 |
| WO | WO 01/92381 A1 | * 12/2001 |

OTHER PUBLICATIONS

Baughman, *Science*, vol. 290, pp. 1310–1311 (Nov. 17, 2000).
Vigolo et al., *Science*, vol. 290, pp. 1331–1334 (Nov. 17, 2000).
Dresselhaus et al., *Mrs. Bulletin*, pp. 45–50 (Nov. 1999).
Britto et al., *Adv. Mater.*, vol. 11, No. 2, pp. 154–157 (1999).
Stephan et al., *Syntehtic Metals*, vol. 108, pp. 139–149 (2000).
Lee et al., *Synthetic Metals*, vol. 113, pp. 209–216 (2000).
de la Chappelle et al., *Synthetic Metals*, vol. 103, pp. 2510–2512 (1999).
Bower et al., *Chemical Physics Letters*, vol. 288, pp.481–486 (1998).
Bandow et al., *Physical Review Letters*, vol. 80, No. 17, pp. 3779–3782 (Apr. 27, 1998).
Burghard et al., *Adv. Mater.*, vol. 10, No. 8, (1998).
Gennett et al., *Chem. Mater.*, vol. 12, pp. 599–601 (2000).
Fang et al., *J. Mater. Res.*,, vol. 13, No. 9, pp.1–7 (Sep. 1998).
Ishigami et al., *Chemical Physics Letters*, vol. 319, pp. 457–459 (2000).
*Science*, vol. 289, pp. 94–98 (Jul. 7, 2000).
Lourie et al., *Adv. Mater.*, vol. 11, pp. 931–934 (1999).
Journet et al., *Production of Carbon Single Wall Nanotubes with Various Diameters*, pp. 47.
Bonnamy et al., *Formation of Single–Walled Nanotubes with Large Diameters by Thermal Treatment*, PTh3.
Zhang et al., *J. Electrochem. Soc.*, vol. 143, No. 12, pp. 5047–5053 (Dec. 1996).
Dai et al., *Nature*, vol. 384, pp. 147–150 (Nov. 14, 1996).
Iijima, *Nature*, vol. 354, pp. 56–58 (Nov. 7, 1991).
Nikolaev et al., *Chemical Physics Letters*, vol. 313, pp. 91–97 (1999).
Journet et al., *Nature*, vol. 388, pp. 756–758 (Aug. 21, 1997).
Thess et al., *Science*, vol. 273, pp. 483–487 (Jul. 26, 1996).
Liu et al., *Science*, vol. 280, pp. 1253–1256 (May 22, 1998).
Iijima et al., *Nature*, vol. 363, pp. 603–605 (Jun. 17, 1993).
Bethune et al, *Nature*, vol. 363, pp. 605–607 (Jun. 17, 1993).

* cited by examiner

*Primary Examiner*—Stuart L. Hendrickson
*Assistant Examiner*—Peter J Lish
(74) *Attorney, Agent, or Firm*—Larry J. Palguta

(57) ABSTRACT

Coagulation spinning produces structures such as fibers, ribbons, and yarns of carbon nanotubes. Stabilization, orientation, and shaping of spun materials are achieved by post-spinning processes. Advantages include the elimination of core-sheath effects due to carbonaceous contaminants, increasing mechanical properties, and eliminating dimensional instabilities in liquid electrolytes that previously prohibited the application of these spun materials in electrochemical devices. These advances enable the application of coagulation-spun carbon nanotube fibers, ribbons, and yarns in actuators, supercapacitors, and in devices for electrical energy harvesting.

23 Claims, 11 Drawing Sheets

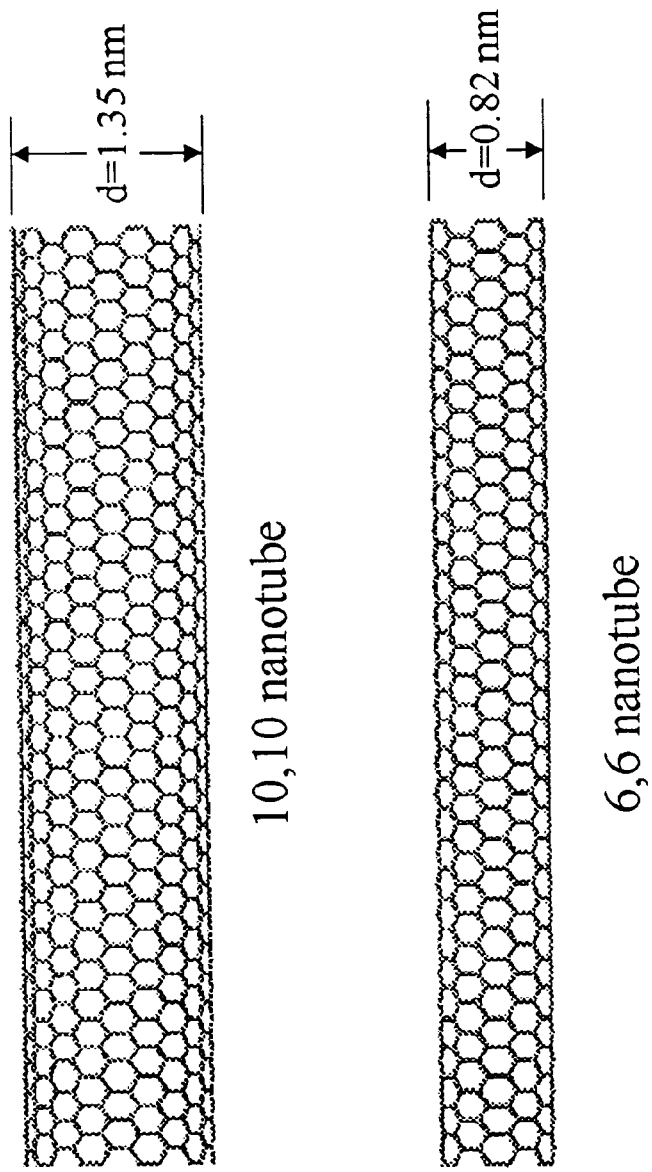

Electro-mechanic response at 1V

Dependence of stress on voltage

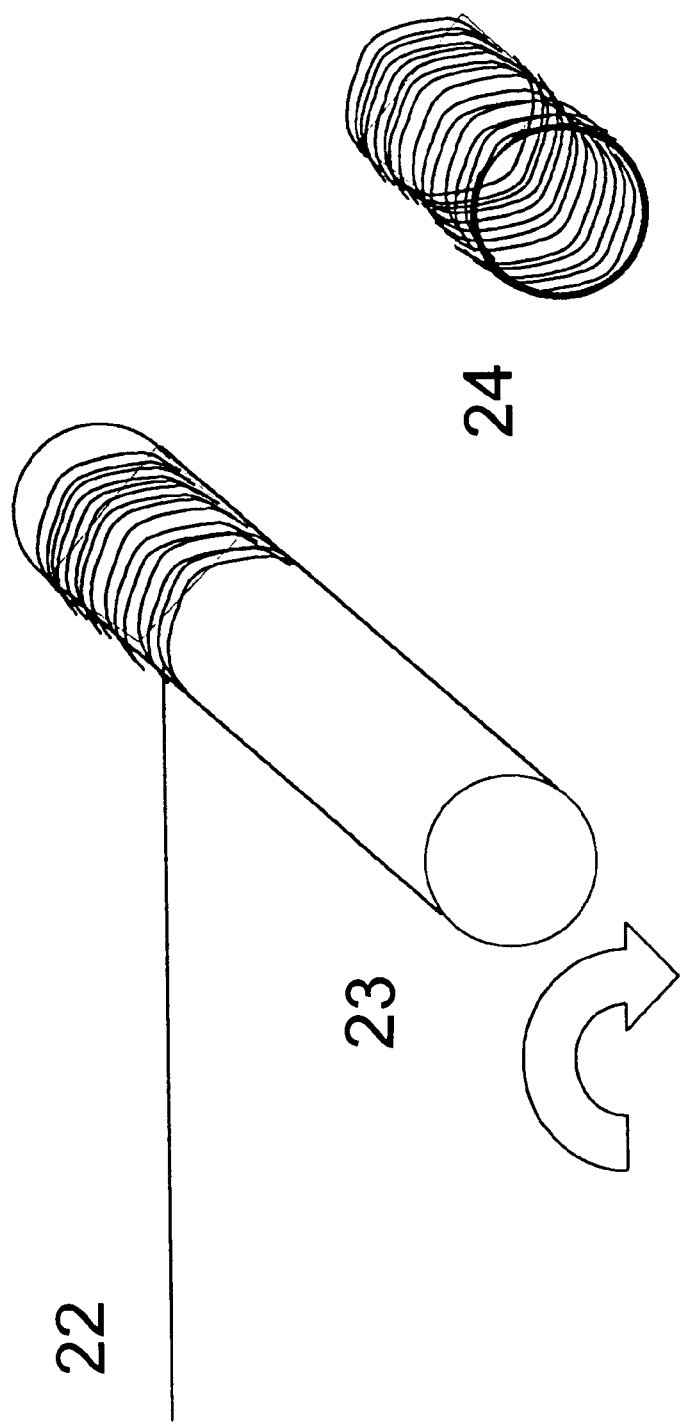

SPINNING, PROCESSING, AND APPLICATIONS OF CARBON NANOTUBE FILAMENTS, RIBBONS, AND YARNS

This application claims priority on provisional Application Ser. No. 60/245,161 filed on Nov. 3, 2000, the entire contents of which are hereby incorporated by reference.

This invention was made with Government support under Contract No. MDA972-00-C-0032 awarded by the Defense Advanced Research Projects Agency. The Government has certain rights in this invention.

BACKGROUND OF THE INVENTION

1. Field of the Invention

Methods are described for spinning fibers, ribbons, and yarns comprised of carbon nanotubes; the stabilization, orientation, and shaping of spun materials by post-spinning processes; and the application of such materials made by spinning.

2. Description of the Related Art

Since the discovery of carbon nanotubes by Iijima and coworkers (Nature 354, 56–58, (1991) and Nature 361, 603–605 (1993)) various types of carbon nanotubes (NTs) have been synthesized. A single-wall carbon nanotube (SWNT) consists of a single layer of graphite that has been wound into a seamless tube having a nanoscale diameter. A multi-wall carbon nanotube (MWNT), on the other hand, comprises two or more such cylindrical graphite layers that are coaxial. Both single-wall and multi-wall nanotubes have been obtained using various synthetic routes, which typically involve the use of metallic catalysts and very high processing temperatures. Typical synthesis routes are those employing a carbon arc, laser evaporation of carbon targets, and chemical vapor deposition (CVD).

SWNTs are produced by the carbon-arc discharge technique using a pure carbon cathode and a carbon anode containing a mixture of graphite powder and catalytic metal(s), like Fe, Ni, Co and Cu (D. S. Bethune et al. Nature 363, 605–7 (1993) and S. Iijima and T. Ichihashi, Nature 363, 603–5 (1993)). C. Journet et al. (Nature 388, 756–758 (1997)) have described an improved carbon-arc method for the synthesis of SWNTs which uses Ni/Y (4.2/1 atom %) as the catalyst. Co-vaporization of carbon and the metal catalyst in the arc generator produced a web-like deposit of SWNTs that is intimately mixed with fullerene-containing soot.

Smalley's group (A. Thess et al., Science 273, 483–487 (1996)) developed a pulsed laser vaporization technique for synthesis of SWNT bundles from a carbon target containing 1 to 2% (w/w) Ni/Co. The dual laser synthesis, purification and processing of single-wall nanotubes has been described in the following references: J. Liu et al., Science 280, 1253 (1998); A. G. Rinzler et al., Applied Physics A 67, 29 (1998); A. G. Rinzler et al., Science 269, 1550 (1995); and H. Dai, et al., Nature 384, 147 (1996).

The CVD method described by Cheng et al. (Appl. Phys. Lett. 72, 3282 (1998)) involves the pyrolysis of a mixture of benzene with 1 to 5 % thiophene or methane, using ferrocene as a floating catalyst and 10% hydrogen in argon as the carrier gas. The nanotubes form in the reaction zone of a cylindrical furnace held at 1100–1200° C. Depending on the thiophene concentration, the nanotubes form as either multi-wall nanotubes or bundles of single-wall nanotubes. Another useful method for growing single-wall nanotubes uses methane as the precursor, ferric nitrate contained on an alumina catalyst bed, and a reaction temperature of 1000° C.

Another CVD synthesis process was described by R. E. Smalley et al. in PCT International Application No. WO 99-US25702, WO 99-US21367 and by P. Nikolaev et al. in Chem. Phys. Lett. 313, 91–97 (1999). This process, known as the HiPco process, utilizes high pressure (typically 10–100 atm) carbon monoxide gas as the carbon source, and nanometer sized metal particles (formed in-situ within the gas stream from organo-metallic precursors) to catalyze the growth of single-wall carbon nanotubes. The preferred catalyst precursors are iron carbonyl ($Fe(CO)_5$) and mixtures of iron carbonyl and nickel carbonyl ($Ni(CO)_4$). The HiPco process produces a SWNT product that is essentially free of carbonaceous impurities, which are the major component of the laser-evaporation and carbon-arc products. The process enables control of the range of nanotube diameters produced, by controlling the nucleation and size of the metal cluster catalyst particles. In this way, it is possible to produce unusually small nanotube diameters, about 0.6 to 0.9 nm. Finally, the HiPco process is scalable to low cost tonnage production and is not nearly as energy intensive as the laser evaporation and carbon-arc processes.

The nanotube-containing products of the laser-evaporation and carbon-arc processes invariably contain a variety of carbonaceous impurities, including various fullerenes and less ordered forms of carbon soot. The carbonaceous impurity content in the raw products of the laser and carbon arc processes typically exceeds 50 weight %. Purification of these products generally relies on selective dissolution of the catalyst metals and highly ordered carbon clusters (called fullerenes) followed by selective oxidation of the less ordered carbonaceous impurities. A typical purification process is described by Lui et al. in Science 280, 1253 (1998). This method involves refluxing the crude product in 2.6 M nitric acid for 45 hours, suspending the nanotubes in pH 10 NaOH aqueous solution using a surfactant (e.g., Triton X-100 from Aldrich, Milwaukee, Wis.), followed by filtration using a cross-flow filtration system. While the effects of these purification processes on the nanotubes themselves are not completely understood, it is believed that the nanotubes are shortened by oxidation.

As discussed by B. I. Jakobson and R. E. Smalley (American Scientist 85, 325, 1997) SWNT and MWNT materials are promising for a wide variety of potential applications because of the exceptional physical and chemical properties exhibited by the individual nanotubes or nanotube bundles. Some SWNT properties of particular relevance include metallic and semiconducting electrical conductivity, depending on the specific molecular structure, extensional elastic modulus of 0.6 TPa or higher, tensile strengths on the order of ten to one hundred GPa, and surface areas that can exceed 300 $m^2/g$.

The proposed applications of carbon nanotubes include mechanical applications, such as in high-strength composites, electrical applications, and multifunctional applications in which different properties aspects of the carbon nanotubes are simultaneously utilized. Tennent et al. in U.S. Pat. No. 6,031,711 describe the application of sheets of carbon nanotubes as high performance supercapacitors. In this application, a voltage difference is applied to two high-surface-area carbon nanotube electrodes that are immersed in a solid or liquid electrolyte. Current flows in the charging circuit, thereby injecting charge in the nanotubes, by creating an electrostatic double layer near the nanotube surfaces.

The application of carbon nanotube sheets as electromechanical actuators has been recently described (R. H. Baughman et al., Science 284, 1340 (1999)). These actuators utilize dimension changes that result from the double-layer electrochemical charge injection into high-surface-area carbon nanotube electrodes. If carbon nanotubes can be assembled into high modulus and high strength assemblies (such as filaments, ribbons, yarns, or sheets) that maintain their ability to electrochemically store charge, then superior actuator performance should be obtainable. The problem has been that no methods are presently available for the manufacture of nanotube articles that have these needed characteristics.

These and other promising applications require assembling the individual nanotubes into macroscopic arrays that effectively use the attractive properties of the individual nanotubes. This obstacle has so far hindered applications development. The problem is that MWNTs and SWNTs are insoluble in ordinary aqueous solvents and do not form melts even at very high temperatures. Under certain conditions, and with the aid of surfactants and ultrasonic dispersion, bundles of SWNTs can be made to form a stable colloidal suspension in an aqueous medium. Filtration of these suspensions on a fine-pore filter medium, as described by Lui et al. in Science 280, 1253 (1998), results in the production of a paper-like sheet which has been called "bucky paper" (in reference to buckminsterfullerene, or $C_{60}$, the first member of the fullerene family of carbon cluster molecules). Such sheets, which can range in conveniently obtainable thickness from 10–100 microns, possess mechanical strength derived from the micro-scale entanglement of the nanotube bundles. Bucky paper preserves the large accessible surface area of the nanotube bundles, but typically exhibit greatly reduced elastic modulus values (a few GPa) that are a very small fraction of the intrinsic elastic modulus of either the individual SWNTs or the SWNT bundles.

A recently reported method for processing carbon nanotubes provides nanotube fibers whose mechanical properties significantly surpassing those of ordinary bucky paper. This method was described by P. Bernier et al. (talk Tue E1 at the *International Conference on Science and Technology of Synthetic Metals*, Gastein, Austria, Jul. 15–21, 2000). According to this process, the carbon nanotubes are first dispersed in an aqueous or non-aqueous solvent with the aid of a surfactant. A narrow jet of this nanotube dispersion is then injected into a rotating bath of a more viscous liquid in such a way that shear forces at the point of injection cause partial aggregation and alignment of the dispersed nanotube bundles. This viscous liquid contains an agent or agents, which act to neutralize the dispersing action of the surfactant. Consequently, the jet of dispersed nanotubes is rapidly coagulated into a low-density array of entangled nanotubes—thereby gaining a small (but useful) amount of tensile strength. The wet filament is then washed in water, and the washed filament is subsequently withdrawn from the wash bath and dried. During which draw-dry process, capillary forces collapse the loosely tangled array of nanotubes into a compact thin fiber having a density of about 1.5 gm/cc (close to the theoretical density of a compact array of carbon nanotubes). This total process will henceforth be referred to as the coagulation spinning (CS) process.

In a typical coagulation spinning process, as described by Bernier et al. (talk Tue E1 at the *International Conference on Science and Technology of Synthetic Metals*, Gastein, Austria, Jul. 15–21, 2000), the nanotubes are dispersed in water with the aid of sodium dodecyl sulphate (SDS) surfactant. The viscous carrier liquid is an aqueous solution of polyvinyl alcohol (PVA) in which the PVA also serves to neutralize the effect of the SDS surfactant by directly replacing these molecules on the NT surfaces. Bernier et al. describe preferred concentrations for the various ingredients, and viscosity ranges and flow velocities of the spinning solutions. Polarized light microscopy of the coagulated nanotube fibers confirms preferential alignment of the NTs along the fiber axis. Further evidence of NT alignment is provided by the measured extensional elastic modulus, which is approximately 10 GPa for the final CS fibers, as compared to typically 1 GPa for bucky paper.

Unfortunately, the fibers made by the CS process are not useful in applications as electrodes immersed in liquid electrolytes because of a surprising shape memory effect. This shape memory effect causes the CS fibers to dramatically swell (by 100% or more) and lose most of their dry-state modulus and strength. Because of this structural instability of fibers made by the CS process, they are unusable for critically important applications that use liquid electrolytes, such as in supercapacitors and in electromechanical actuators. In contrast, as-produced bucky paper made from the same nanotubes can be used for both capacitor and actuator devices that use liquid electrolytes.

Another drawback of the current CS process is that it has been successfully applied only for nanotube-containing samples that contain an enormous amount of carbonaceous impurities (about 50% by weight or more). Practice of this CS process with purified nanotubes has been universally unsuccessful, which has suggested that the carbonaceous impurities might be playing an important role in the initial stage of the CS spinning process. Because of the presence of these impurities, the as-spun carbon nanotubes fibers contain about 50 volume percent of carbonaceous impurities, which degrade mechanical and electronic properties. In addition, since the CS process does not enable a substantial mechanical draw, the obtained modulus of the fibers made this process is 15 GPa or less, which is over an order of magnitude lower than that of the constituent nanotubes (about 640 GPa).

SUMMARY OF THE INVENTION

As has been shown, the coagulation spinning (CS) process of the conventional art has disadvantages which prevent the utilization of carbon nanotube structures as electrode materials. The conventional art process could not be successfully applied to carbon nanotubes that are substantially free of carbonaceous impurities. The conventional art process was unstable since it could be practiced only in a narrow range of spinning parameters and a very restricted concentration range for the carbon nanotubes in the spinning solution. The degree of alignment of the fibers produced by the conventional art CS process is not high. Also, the nanotube fibers spun by the conventional art are not dimensionally stable and the mechanical properties degrade when these fibers are placed in liquid electrolytes for electrochemical applications.

An advantage of this invention, in part, is that it eliminates the deficiencies in the conventional coagulation spinning (CS) process and in the properties of these conventional spun materials. Two critical deficiencies are (1) the need to conduct CS spinning with highly impure material that typically contains over 50% by weight carbonaceous impurities that are intimately mixed with the carbon nanotubes and (2) the dimensional and mechanical instability of materials spun by the CS method in the liquid electrolytes that are used for important applications.

A further advantage of this invention, in part, is that it enables the continuous, high-throughput spinning of structures such as fibers, ribbons, and yarn. Yet another advantage of this invention is that it improves the mechanical properties of spun materials by providing means to increase the draw ratio of materials produced by the CS approach.

A further advantage of this invention, in part, is that it provides means for the production of CS derived materials in the forms that are most useful for particular applications.

The invention, in part, provides a coagulation spun structure containing single-wall carbon nanotubes, the structure swelling by less than 10% in diameter when immersed in water.

The invention, in part, provides fiber, ribbon or yarn having greater than about 90 weight percent carbon single-wall nanotubes, wherein the average diameter of the single wall carbon nanotubes ranges from about 0.6 to 0.9 nm. The invention, in part, also provides a fiber of single-wall carbon nanotubes that contain no binding agents or carbonaceous impurities.

The invention, also in part, provides a process for making a structure containing carbon nanotubes that entails forming a uniform suspension of carbon nanotubes in a liquid, coagulation spinning the suspension to form the structure, and annealing the structure at annealing temperatures sufficient to stabilize the structure again swelling and loss of mechanical strength upon emersion in water or another liquid.

The invention, also in part, provides a process of coagulation spinning of a fiber ribbon or yarn that entails providing a first liquid comprising a uniform dispersion of single wall carbon nanotubes, and injecting the first liquid as a jet into a second coagulation liquid, the jet being formed in an orifice of decreasing diameter that creates a converting flow field at close to the point of injection into the second coagulation liquid.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will be more clearly understood and further applications will be apparent when reference is made to the following detailed description of preferred embodiments of the invention which are given by way of illustration only, and thus are not limitative of the present invention, and wherein:

FIG. 1 shows the molecular structures of (6,6) and (10,10) carbon nanotubes.

FIG. 11 shows a schematic of a wound article comprising ribbons of aligned carbon nanotubes produced by the improved coagulation spinning process and stabilized by heat treatment.

DETAILED DESCRIPTION OF THE PREFERRED EMBODIMENTS

Figure 2A:
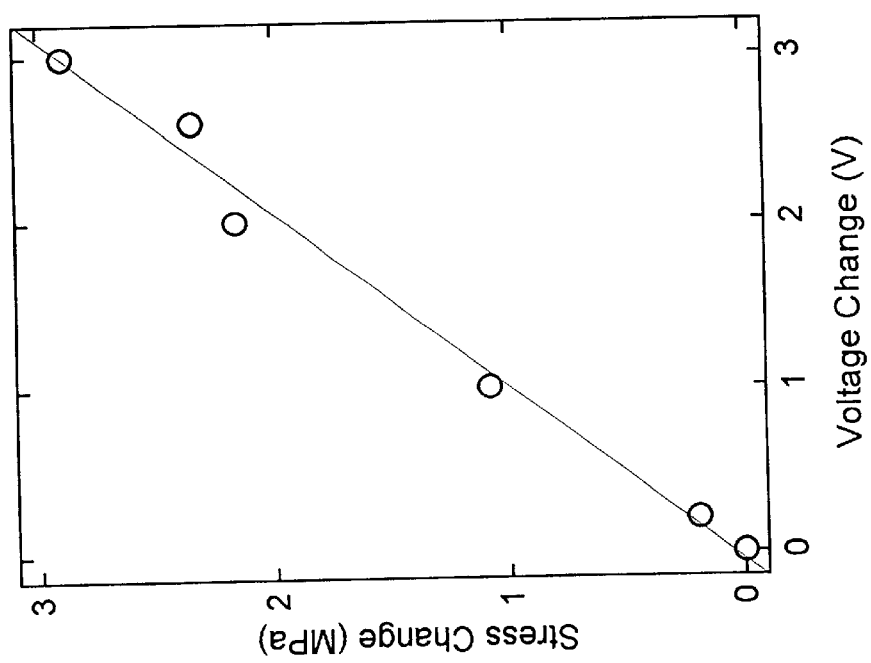
FIG. 2a shows plots of actuator strain for an thermally annealed coagulation-spun SWNT fiber in 1 molar NaCl aqueous solution.

The coagulation spinning (CS) process of the conventional art has the following liabilities that are eliminated by the present invention: (a) the conventional art process could not be successfully applied to carbon nanotubes that are substantially free of carbonaceous impurities, (b) the conventional art process was unstable since it could be practiced only in a narrow range of spinning parameters and a very restricted concentration range for the carbon nanotubes in the spinning solution, (c) the degree of alignment of the fibers produced by the conventional art CS process is not high, and (d) the nanotube fibers spun by the conventional art are not dimensionally stable and the mechanical properties degrade when these fibers are placed in the liquid electrolytes that are needed for key applications.

The invention overcomes the difficulties associated with CS process described by P. Bernier et al. (Talk Tue E1 at the *International Conference on Science and Technology of Synthetic Metals,* Gastein, Austria, Jul. 15–21, 2000). According to this process, the carbon nanotubes are first dispersed in an aqueous or non-aqueous solvent with the aid of a surfactant. A narrow jet of this nanotube dispersion is then injected into a flowing stream of a more viscous carrier liquid in such a way that shear forces at the point of injection cause partial aggregation and alignment of the dispersed nanotube bundles. The viscous carrier liquid also contains an agent or agents, which act to neutralize the dispersing action of the surfactant. Consequently, the jet of dispersed nanotubes is rapidly coagulated into a low-density array of entangled nanotubes—thereby gaining a small but useful amount of tensile strength. The wet filament is then washed in water, and the washed filament is subsequently withdrawn from the wash bath as it is dried.

In a typical conventional coagulation spinning process, described by Bernier et al. at the above conference, the nanotubes are dispersed as a substantially uniform suspension in water with the aid of sodium dodecyl sulphate (SDS) surfactant. The viscous carrier liquid is an aqueous solution of poly(vinyl alcohol) (PVA) in which the PVA serves to neutralize the effect of the SDS surfactant by directly replacing the SDS molecules on the NT surfaces. These nanotube dispersions were injected as a liquid jet into a rotating bath of an aqueous solution of PVA using a syringe pump and a capillary tube immersed in the PVA solution. Under favorable conditions, the nanotube solution formed a continuous ribbon as a spiral inside the PVA solution. Bernier et al. mention preferred concentrations for the various ingredients, and viscosity ranges and flow velocities of the spinning solutions. The ribbon was subsequently washed in water and dried in air during drawing from an aqueous bath to form nanotube filaments.

The initial attempts to improve the CS process focused on replacing the unpurified nanotube soot with chemically purified arc-produced or laser-produced nanotubes. The results of Examples 2–4, indicate that impurities in the nanotubes might be serving as essential binding agents at the junctions between nanotubes during the critically important coagulation stage of spinning. The liquid jet containing chemically purified carbon nanotubes either broke into short segments during injection of the liquid jet into the carrier liquid or formed poorly structured ribbons that were too weak to remove from the wash bath.

In contrast with the applicability of the CS process for unpurified carbon-arc-produced SWNT samples containing about 50% by weight carbonaceous impurities, the results of Example 2 show that the chemically purified arc-produced SWNTs could not be spun. In addition, Example 3 shows that purified SWNTs obtained by chemically purifying the product of the laser evaporation method (J. Lui et al., Science 280, 1253 (1998)) could also not be spun by the CS process. Likewise, Example 4 shows that purified SWNT samples could not be spun that were derived by chemically purifying the reaction product of the decomposition of methane over a catalyst-containing zeolite.

While all of the above described attempts to spin fibers of chemically purified nanotubes by the CS process failed, we were surprisingly successful in spinning high purity SWNT produced by the carbon monoxide process (HiPco). These nanotube fibers, which have narrow diameters (about 0.8 nm) and long bundle lengths, spin over a much broader concentration range than the unpurified arc-produced nanotube soot, and produce mechanically robust fibers that are easily drawn from the coagulation bath. While CS fibers made using unpurified nanotube soot contain a nanotube-rich core surrounded by a thick crust of carbonaceous impurities, the HiPco CS fibers of the invention are free of crust and consist almost entirely of carbon nanotubes. This surprising success is described in Examples 1 and 5.

The preferred nanotubes made by the high pressure disproportionation of carbon monoxide can have a smaller diameter, in the range 0.6 nm to 0.9 nm, than those made by the laser evaporation or carbon arc processes, which typically produce nanotubes with diameters greater than 1 nm. The most preferred nanotubes for coagulation spinning are made by the HiPco process at high pressure (typically 30–50 atmosphere), at high temperatures (typically 900–1100° C.), and using an iron containing catalyst. To illustrate the difference, FIG. 1 shows a (6,6) nanotube with a diameter of about 0.6 nm, a structure which may be present at high concentrations in the HiPco product, contrasted with a (10,10) nanotube with a diameter of about 1.4 nm. The (10,10) nanotube is one of many structures of larger diameter, which typically comprise the products of the laser evaporation and carbon arc processes. We believe that the small diameter of the HiPco nanotubes contributes, along with the freedom from carbonaceous impurities, to the robustness of the coagulation-spun fibers, ribbons and yarns. The uniqueness of the HiPco material of the invention is demonstrated by the Examples 2–4, which show that chemically purified arc-produced nanotubes, chemically purified laser-produced nanotubes, and chemically purified zeolite-produced nanotubes are unsatisfactory for processing by the coagulation spinning process.

The present discovery that high purity, small-diameter HiPco SWNTs can be spun by CS provides an opportunity to engineer the properties of CS spun structures such as fibers, ribbons, and yarns. This technology can also be utilized to form structures such as sheets, tapes, mats, threads, tubes, ropes, twines, braids and cords. For example, in order to increase the area of nanotube surface exposed to electrolyte for electrochemical applications, one can use the coagulation spinning process to create fibers, ribbons, and yarns comprising a mixture of HiPco and other single-wall or multi-wall nanotubes such that the diameter distribution of the nanotubes is at least bimodal with one peak centered in the range of 0.6 nm to 0.9 nm and one or more other peaks at a larger diameters in the range of about 1.0 nm to about 2.0 nm. In this case the tendency of the nanotubes to form well-ordered bundle structures is partially disrupted and more surface area is available for contact with the electrolyte. While narrow diameter carbon nanotubes prepared by the high pressure carbon monoxide process are most preferred for invention embodiments, various known methods (W. K. Hsu, Chem. Phys. Lett. 323, 572–579 (2000)) can be used to add a significant amount of boron or nitrogen to carbon nanotubes and these boron or nitrogen containing nanotubes are within the preferred range of compositions for invention embodiments.

Figure 3:
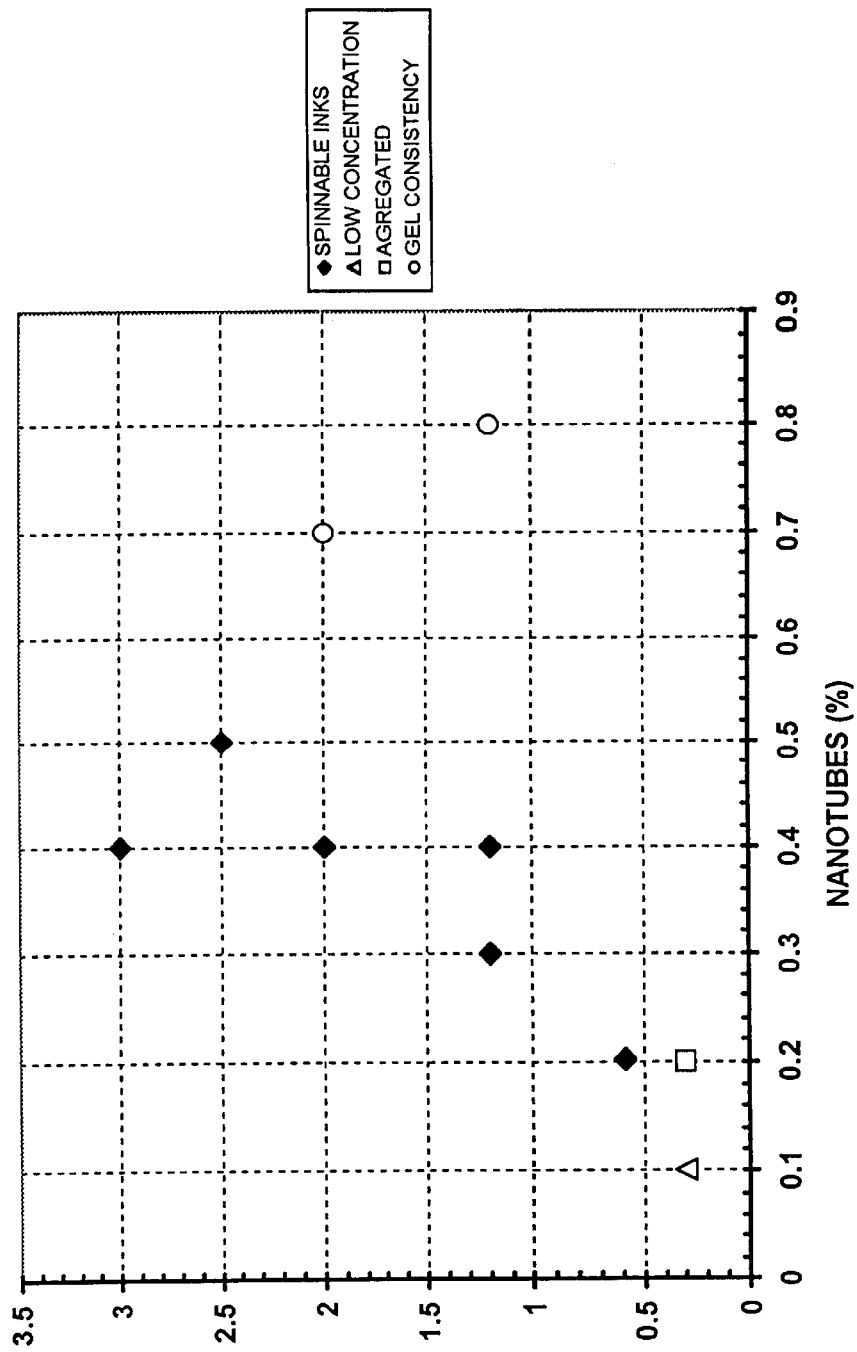
FIG. 3 shows compositions of spinable inks and gels in the water/carbon nanotube/sodium dodecyl sulphate system.

An important additional advantage of using HiPco nanotubes in coagulation spinning is that the range of spinable NT suspension compositions in the water-nanotube-sodium dodecyl sulphate (SDS) system is expanded to a wider range of NT concentrations and to a wider range of SDS concentrations than in the known CS process using impure carbon-arc-produced NTs. This is illustrated in FIG. 3 which shows that aqueous suspensions of HiPco nanotubes containing up to 0.5 wt. % NTs and up to 3 wt. % SDS can be spun into continuous fibers. The increased NT concentrations in these HiPco nanotube suspensions are advantageous in that they lead to stronger more easily processed filaments in the wet state.

The invention is not restricted to spinning nanotube dispersions that use sodium dodecyl sulphate as a surfactant. Other sodium alkyl sulfates can be used in the range of sodium $C_8$–$C_{30}$ alkyl sulphate. Examples of these sodium alkyl sulphates include sodium nonyl sulphate, sodium decyl sulphate, sodium undecyl sulphate, sodium tetradecyl sulphate, sodium hexadecyl sulphate, sodium lauryl sulphate, sodium stearyl sulfate and sodium cetyl sulphate. Sodium alkyl sulfates based upon coconut oil, tallow or tall oil may be used. Besides the anionic surfactants, cationic and nonionic surfactants can be used. Cationic surfactants include alkylpyridinium halides and quaternary ammonium salts such as dialkyldimethylammonium salts, alkylbenzyldimethylammonium chlorides, alkyltrimethylammonium salts. Nonionic surfactants include polyoxyethylene surfactants, alkylphenol ethoxylates, carboxylic acid esters, glycerol esters, anhydrosorbitol esters, ethoxylated fats, oils and waxes, and glycol esters of fatty acids. Mixtures of surfactants can also be used. In certain cases, like the coagulation spinning of carbon nanotubes from dispersions in organic liquids or the spinning of polymer-coated nanotubes from organic liquids, it is not necessary to use a surfactant in the spinning solution. Examples of organic liquids are toluene, xylene, and related aromatics, alcohols, glycols, $C_8$–$C_{30}$ hydrocarbons, esters such as ethyl acetate, ketones, dimethylsulfoxide and dimethylformamide.

FIG. 3 also shows two aqueous compositions at 1.2 wt. % SDS-0.8% NTs and at 2.0 wt. % SDS-0.7% NTs that form homogeneous spinable gels after sonication. By a gel we mean a semi-solid material which is quite soft but which will maintain its shape and not spontaneously flow like a liquid under arbitrarily small forces. This gel will not flow easily through the narrow capillary channel used in the known coagulation spinning process, but it can be forced by higher pressures to flow through a larger diameter feed tube and thence through an orifice of the type shown in FIG. 4, from which it is injected into a moving carrier bath. A major degree of nanotube orientation into directions parallel to the flow streamlines occurs as the gel is extruded through the shear flow region in the orifice, and the new oriented juxtaposition of the nanotubes is temporarily fixed by the gel's resistance to flow. In this case, the viscosity of the carrier bath is less important than in the case where the injected nanotube solution is a liquid. The coagulation action of the carrier bath does not have to be as strong since the gel has some strength, which preserves the extruded shape after ejection into the carrier bath. In addition, the spinable aqueous NT-SDS gels can be spun into non-aqueous polar solvents such as alcohols or glycols which rapidly extract the water from the injected NT jet, thereby producing a more robust filament which can be drawn in the wet state to improve NT alignment.

Our efforts to use the long SWNT fibers produced by the CS process showed these fibers were useless for applications that use expose these fibers to a liquid electrolyte—such as in liquid-electrolyte-based energy storage, actuator, and energy harvesting devices. More specifically, fibers made by this process swell in diameter by up to 300% when immersed in water or an aqueous electrolyte, and dramatically decrease both modulus and strength. It appears that inter-bundle stress transfer within the fibers is facilitated by residual polymer from the spinning bath (such as PVA). Immersion in an aqueous solution apparently transforms this residual polymer into a gel having little binding capability, causing a shape memory effect in which the fibers partially expand to distantly approach the post-coagulation, pre-dried state.

Fortunately, we discovered (Example 6) that this degradation could be eliminated by simply annealing the as-spun fibers (for example, at 250° C. for one hour in dynamic vacuum). Thereafter, the carbon nanotube fibers preformed well as electromechanical actuators, as shown in Example 7. The times and temperatures that are preferably utilized are interrelated, since a thermal exposure at high temperature and short times can have the equivalent effect of thermal exposure at a lower temperature for shorter times. The preferable temperatures range from about 200° C. to about 2100° C. More preferably, this temperature range is about 400° C. to about 1200° C. In these lower limits, the times utilized have no upper limit, but the preferred lower limit on the annealing time is about 20 minutes. At the highest temperature, the preferred annealing time is in milliseconds or sub-milliseconds. At the lower annealing temperatures the annealing process can be optionally conducted in air. However, at long annealing times at temperatures above about 600° C. it is preferable that the annealing be conducted in an inert atmosphere or in a reducing atmosphere, such as hydrogen.

In addition, long residence times at temperatures of higher than about 1500° C. can cause the growth of nanotube diameters by inter-tube coalescence. Similarly, long residence times at above 2000° C. are usually undesirable, since substantial exposure at these temperatures can convert SWNTs to MWNTs. One skilled in the art can determine the optimal residence time at a particular temperature or combination of temperatures by using thermogravimetric analysis to characterize the thermal exposure required to substantially remove any bonding agent (such as PVA) that degrades mechanical properties by losing mechanical strength in an aqueous electrolyte. This combination of annealing times and temperatures should preferably reduce the diameter swelling of the nanotube fiber when immersed in water to less than 10%. More preferably, the swelling in nanotube diameter should be negligible when the nanotube is immersed in any electrolyte used for devices.

Annealing carbon nanotube fibers under a state of tension, applied especially during the lower temperature stages of the annealing process, can be used to increase the elastic modulus of the material in the annealed state. Such annealing processes, with and without applied tensile forces, can also be applied to woven or wound structures comprising carbon nanotube fibers, ribbons or yarns produced by the coagulation spinning process. In one preferred annealing processes, the fiber, ribbon or yarn is treated under a state of tension in an atmosphere of steam as the temperature is raised from ambient to about 400° C. The steam acts to soften residual polymeric material in the fiber and facilitate nanotube alignment during stretching. Optionally, the atmosphere can be then changed to an inert atmosphere, such as high purity argon or nitrogen, or vacuum, and the temperature can be increased to about 1100° C. while the tension is maintained. The tensile stress in the fiber, ribbon, or yarn is preferably maintained in a range of between about 10 MPa and about 300 MPa and more preferably between about 50 MPa and about 200 MPa during annealing. As an alternative preferred method, the carbon nanotube fiber, ribbon, or yarn can be held at substantially constant length during the annealing process. Because the carbon nanotubes can be readily oxidized at temperatures in excess of 600° C., annealing at these temperatures is preferably accomplished in either an inert or reducing atmosphere.

Figure 4:
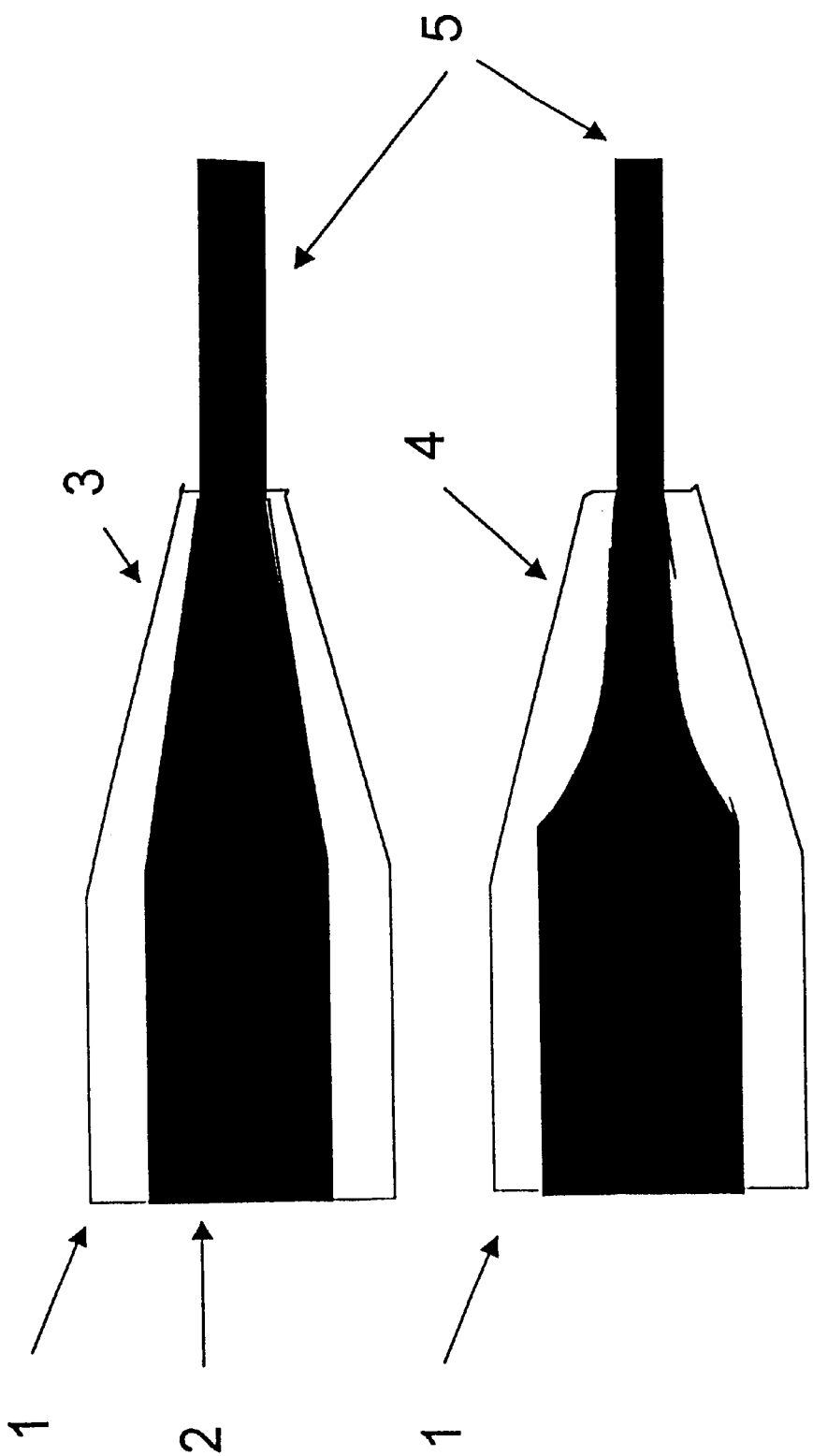
FIG. 4 shows two shear-flow injection nozzles for the coagulation spinning process, a variable-shear-rate design with a conical cross-section, and a constant-shear design with a parabolic cross-section.

Additionally, the invention provides methods for improving upon the known coagulation spinning process to increase nanotube alignment and to transform this semicontinuous or batch process to a continuous process. FIG. 4 shows schematic drawings of two shear-flow-inducing spinnerets or nozzles for creating alignment of the suspended nanotube arrays prior to injection into the coagulation bath. The use of shear-flow-inducing spinnerets or nozzles of this general design is well known in the art of spinning dissolved or molten polymers, but is unknown and undemonstrated for spinning of fibers from a colloidal suspension. A. G. Ferrari in U.S. Pat. No. 3,382,535 describes the design principles for this type of spinning nozzle. H. L LaNieve in U.S. Pat. No. 4,015,924 describes a formula for a capillary profile to establish an essentially constant extensional strain rate condition for flow of liquid. Both nozzles shown in FIG. 4 are characterized by a section of decreasing diameter immediately upstream from the injection orifice. In both cases, a nozzle body 1 conducts a flow of the nanotube suspension 2 through a converging flow field 3 and 4, after which a jet of nanotube suspension 5 is injected into the coagulation bath (not shown). In the constant-shear-rate nozzle, the converging flow section 4 is parabolic in shape. The simple conical converging flow section 3 of the variable shear nozzle is easier to manufacture and is especially preferred for coagulation spinning applications. In both of these nozzles the inlet diameter is preferably in the range of from about 0.5 mm to about 5 mm and more preferably in the range of from about 1 mm to about 3 mm while the minimum diameter of the jet at the outlet is preferably in the range of from 0.01 mm to about 1 mm and more preferably in the range of from about 0.05 mm to about 0.2 mm. Similarly, for both designs, the ratio of the cross-sectional area of the entrance flow field to that of the exit flow field is preferably in the range of from about 5 to about 1000 and more preferably in the range of from about 10 to about 100. Both of these designs are effective at flow alignment of the NTs near the center of the NT suspension jet, but alignment is less effective near the perimeter of the jet due to boundary layer constraints.

The advantage of this shear flow injection nozzle over the unconstrained jet injection method of the known CS process is that using the shear flow nozzle allows a significant increase in the intensity of the extensional flow in the NT suspension with an accompanying increase in the degree of NT alignment in the resulting fibers and ribbons. The nozzle geometries shown in FIG. 4 can be used to spin either liquid, gel, or semisolid carbon nanotube suspensions.

In the example shown in FIG. 4, the cross-sections of the inlet and outlet flows are round. However, shaped fibers can be created by appropriately shaping the outlet orifice. In the simplest case, an oval or rectangular ribbon cross-section can be made in this way but it is also possible to create fibers with a wide range of multi-lobed cross-sections which are substantially non-round, non-elliptical, non-oval, and non-rectangular in shape. This family of shaped fiber cross-sections includes but is not limited to star shapes, cross shapes, Maltese cross shapes and the like. Such shaped NT fibers are useful in the construction of electrochemical carbon nanotube materials and devices for minimizing the time for diffusion of ions from an electrolyte to NTs in the interior of a fiber, while retaining the full tensile properties of NTs oriented in the fiber direction.

Figure 5:
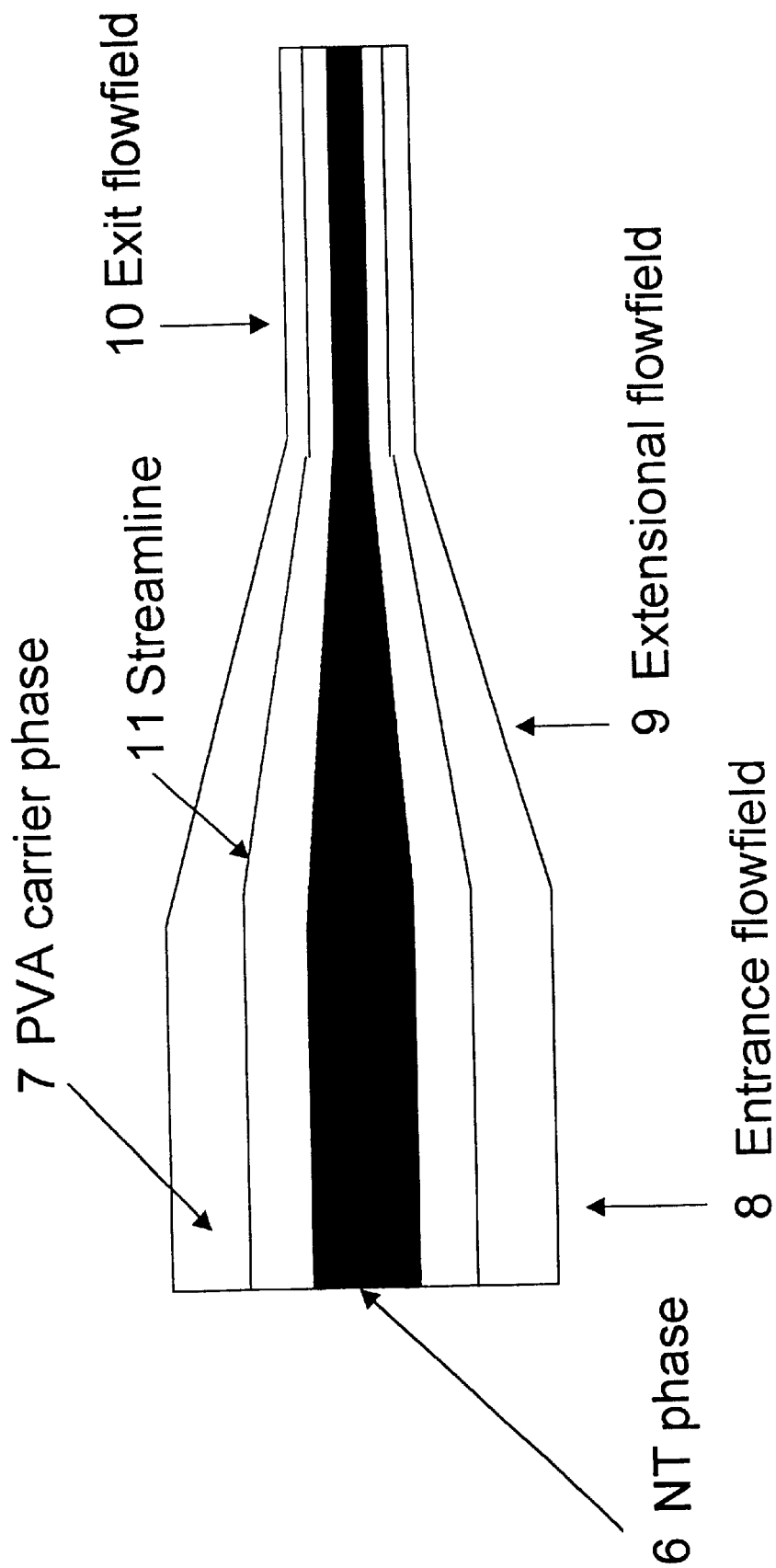
FIG. 5 shows a coaxial pure extensional flow nozzle for the coagulation spinning process.

FIG. 5 shows schematically a contained flow variant of the coagulation spinning process in which the nanotube suspension 6 and the carrier phase 7 are simultaneously introduced into a contained entrance flow field 8 and subsequently pass through a contained extensional flow field 9 and a contained exit flow field 10. In this case, the boundary of the NT suspension jet is unconstrained as it passes through the contained extensional flow field, resulting in nearly pure extensional flow in this region across the entire diameter of the jet. All flow streamlines 11, which enter the entrance flow field on the left will be found to leave through the exit flow field on the right. The various flow field dimensions and area ratios in this design are the same as quoted above for the nozzle designs shown in FIG. 4. The advantages of this process variant include full control over the extensional reduction in area leading to maximum NT alignment. In addition, this process variant captures the newly formed coagulated wet NT filament in a contained flow convenient for application of the subsequent process steps illustrated in FIGS. 6 and 7.

Figure 6:
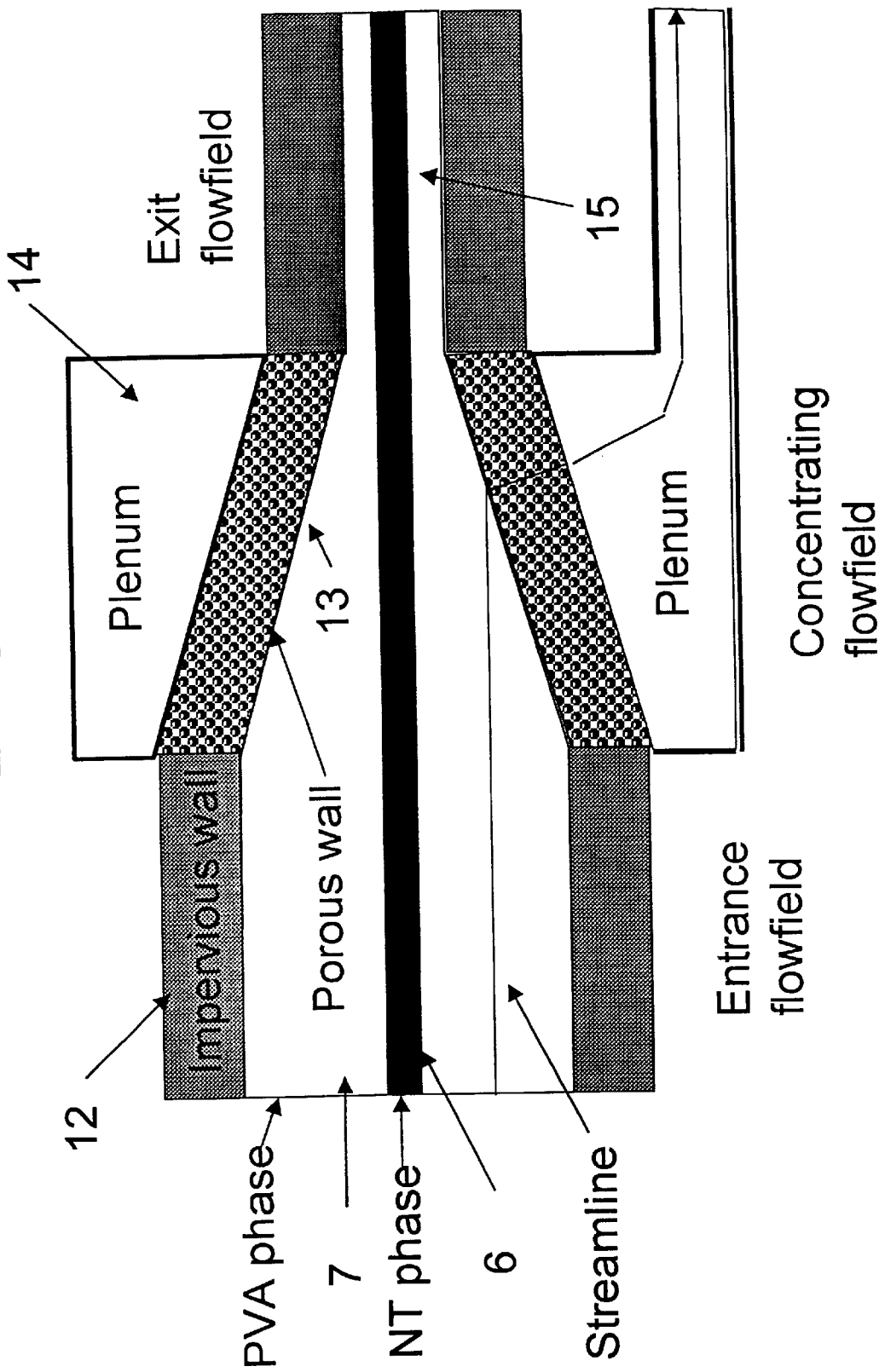
FIG. 6 shows a concentrating nozzle for removing excess carrier liquid in the coagulation spinning process.

FIG. 6 shows a schematic of a concentrating nozzle which accepts the output of the nozzle of FIG. 5 including the coagulated NT filament 6 (of the nanotube suspension) and the coagulating liquid stream 7 (of the carrier phase). An impervious wall 12 bound the entrance flow field of this nozzle. The concentrating flow field, however is bounded by a porous wall 13, through which a metered amount of coagulating liquid exits into a surrounding plenum 14 from which it can be recycled to the upstream stages of the process. The exit flow field 15 now contains the coagulated filament 6 and a much-reduced flow of coagulating liquid. The dimension of this nozzle and exit flow rate of coagulating liquid are preferably selected so as to remove preferably at least 80% and more preferably at least 95% of the coagulating liquid. A positive displacement pump, such as a gear pump controls the volume flow rate of the exiting coagulation liquid. The coagulated wet NT filament now passes out of the exit flow field surrounded by a thin layer of coagulating liquid which serves to lubricate and protect the filament from disruption by velocity gradients in the boundary layer near the exit flow field wall.

Figure 7:
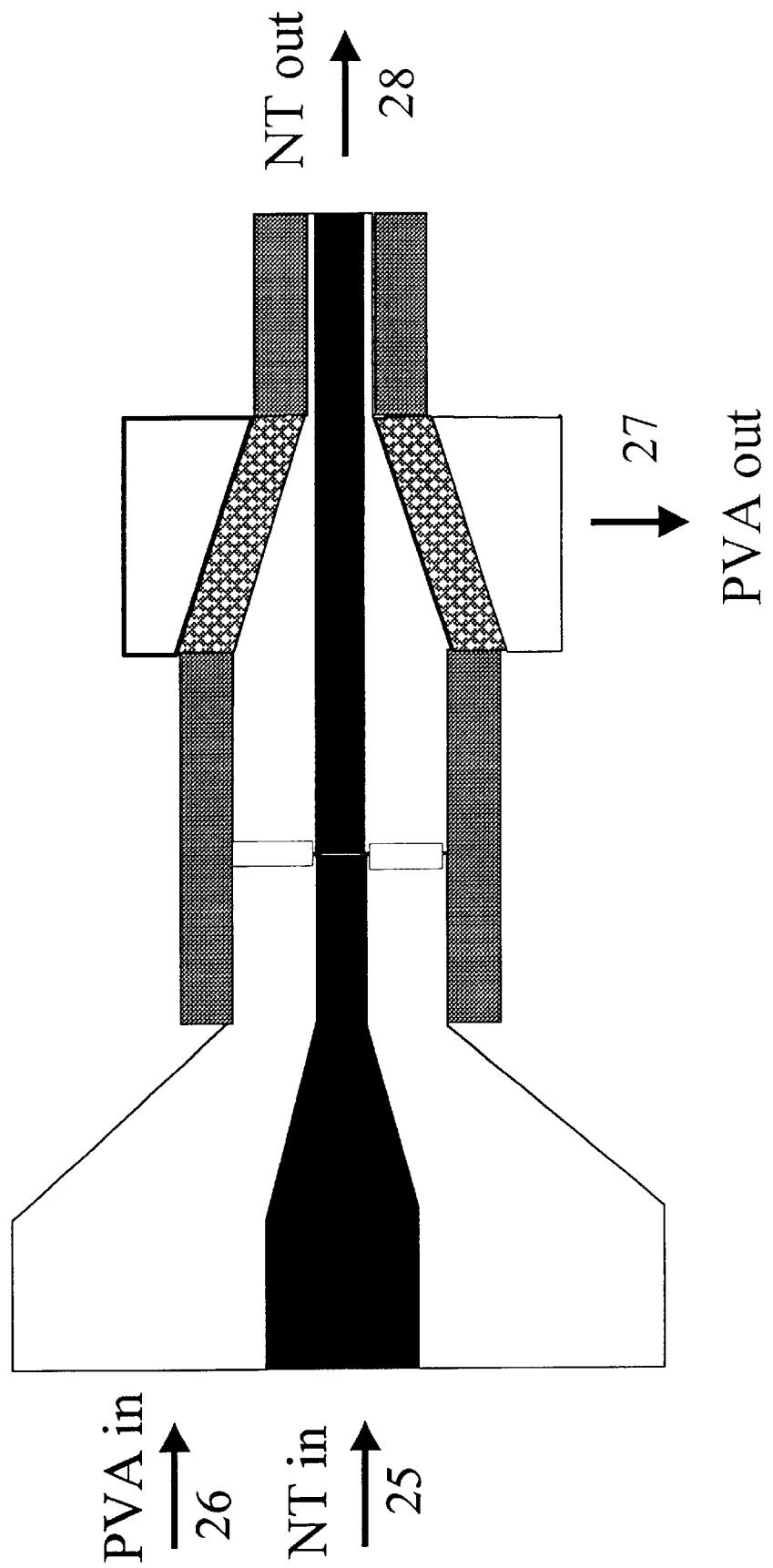
FIG. 7 shows the extensional flow nozzle of FIG. 5 combined with the shear flow nozzle of FIG. 5.

FIG. 7 shows a combination of the shear flow nozzle of FIG. 4 combined with the coaxial extension flow nozzle of FIG. 5. In this case, the nanotube suspension 25 and the PVA phase 26 are introduced into the flow field so that the NT filament 28 exits the nozzle while the effluent PVA 27 exits the sides.

Figure 8:
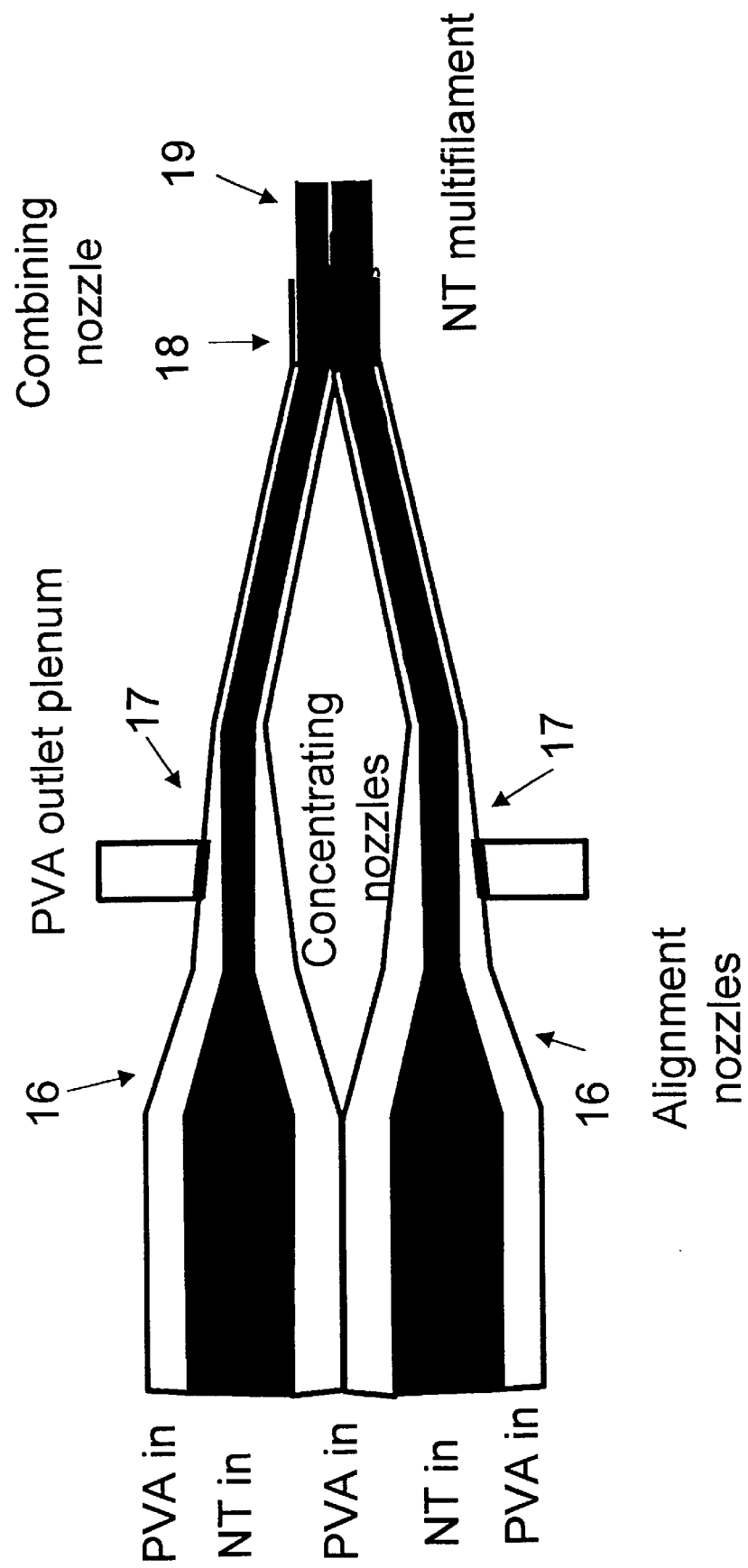
FIG. 8 shows a flow junction for combining multiple filaments in the coagulation spinning process.

FIG. 8 shows schematically a combination of the aligning nozzles 16 and the concentrating nozzles 17 wherein the aligning nozzle exit flow field and stream dimensions are identical to the input flow field and stream dimensions of the concentrating nozzles. Some distance between the two nozzles is required to allow sufficient time for the full coagulation of the NT filament. This distance depends on the diameter of the NT filament and the flow velocity. In general, the distance needed for an acceptable degree of coagulation is less for smaller diameter filaments and lower flow velocities. The ratio of the coagulation distance to the exit/entrance flow field diameter is preferably in the range of about 5 to about 100 and more preferably in the range of from about 10 to about 20. The NT filaments are combined at the combining nozzle 18 to produce a NT multifilament 19.

Due to the strong extensional flow applied in the contained flow nozzle of FIG. 5, the diameter of the coagulated NT filament is typically much smaller that that produced in the known versions of the CS process. Although the contained flow filament has higher strength per unit of cross-sectional area, the overall-breaking load of the filament is smaller and subsequent handling of a monofilament is difficult. In such cases, it is customary to handle fine fibrous materials as yarns to increase the breaking load by a factor approximately equal to the number of monofilaments in the yarn cross-section.

Since electrochemical applications of carbon nanotubes as actuators, supercapacitors, energy harvesting devices, and hydrogen storage devices require high surface area, the extremely high density reported for CS spun fibers (Bernier et al., talk Tue E1 at the *International Conference on Science and Technology of Synthetic Metals,* Gastein, Austria, Jul. 15–21, 2000) suggests that these applications would be impossible for the CS derived nanotube fibers. Consequently, we unexpectedly discovered that coagulation spun HiPco NTs provide robust electromechanical actuation after they have been thermally annealed.

Figure 2B:
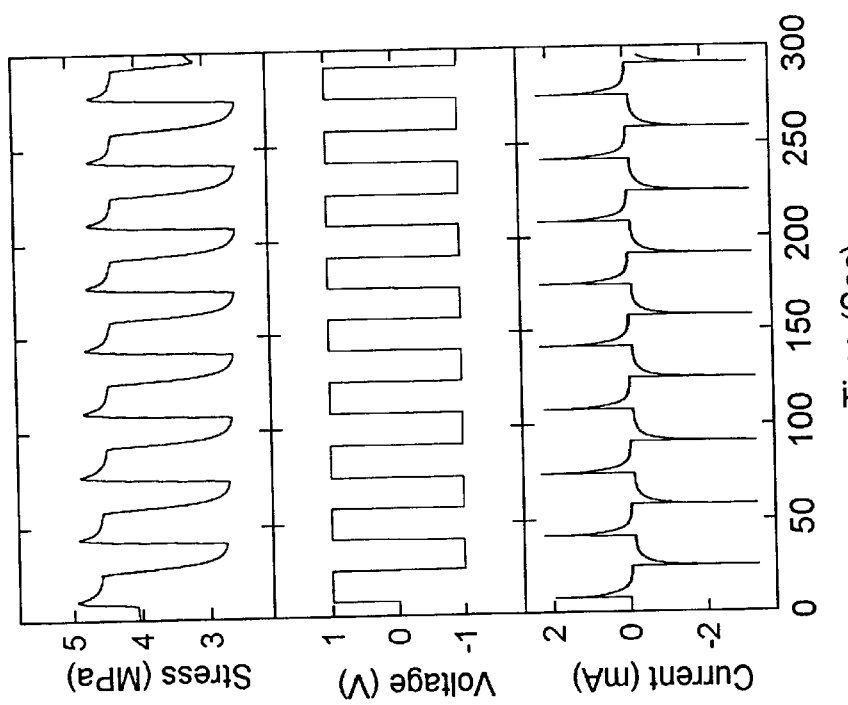
FIG. 2b shows the generated stress versus the peak-to-peak of the applied voltage.

Electrochemical actuation of coagulation spun and annealed fibers is shown in FIG. 2 and described in more detail in Example 7. FIG. 2a shows plots of actuator strain for an thermally annealed coagulation-spun SWNT fiber in 1 molar NaCl aqueous solution during changes in the applied voltage (versus saturated calomel electrode, SCE) and charging current. The applied voltage (versus SCE) is ±1 volt. FIG. 2b shows the generated stress versus the peak-to-peak of the applied voltage (symmetrically measured about 0 voltage on the SCE scale). This is the first demonstration of significant electromechanical actuation for a carbon nanotube fiber of any sort. This discovery enables a range of applications based on the application of carbon nanotubes in liquid electrolytes, which require a high surface area.

Figure 9:
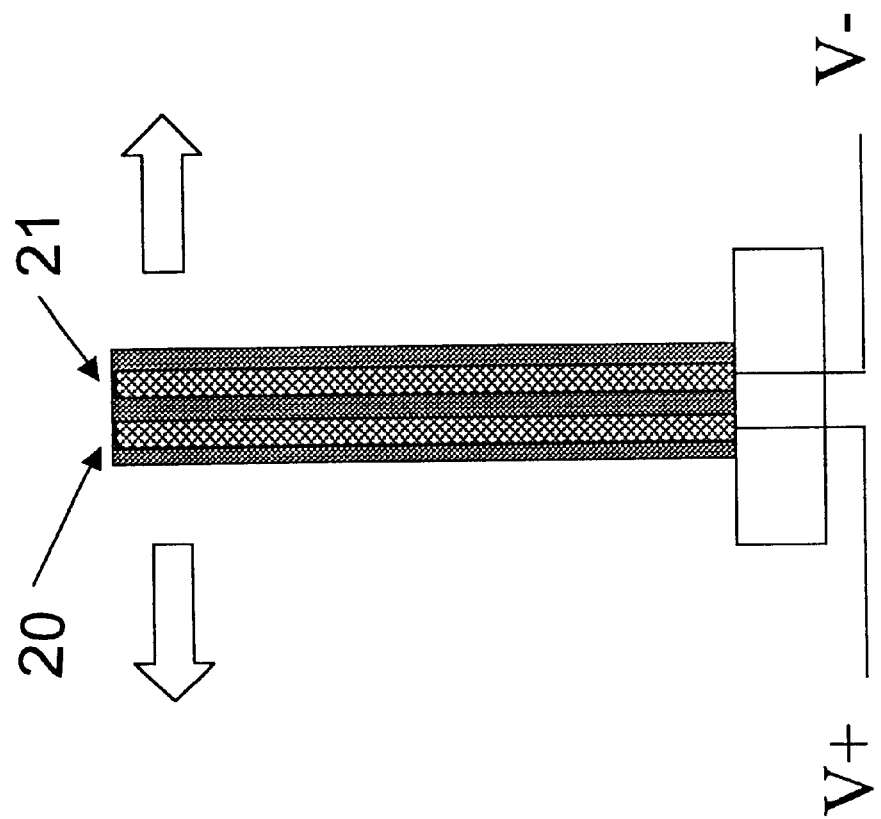
FIG. 9 shows a schematic of a double-layer charge electromechanical actuator that also functions as a supercapacitor.

Actuator devices, supercapacitor, energy harvesting and related electrochemical devices based on carbon nanotubes are described by Baughman et al. in Science 284, 1340–1344 (1999) and in a copending patent application. Also, Tennent et al. have described in U.S. Pat. No. 6,031, 711 the application of sheets of carbon nanotubes as high performance supercapacitors. FIG. 9 shows a double layer electromechanical actuator that also functions as a supercapacitor. Each of these devices comprise at least two electrodes, 20, 21 at least one of which comprises carbon nanotubes, and at least one electrolyte. Various electrolytes can be used for applying the annealed nanotube fibers, ribbons, and yarns in electrochemical devices, including actuators, supercapacitors, and devices for harvesting electrical energy. Very high ionic conductivity electrolytes (like concentrated aqueous KOH and sulfuric acid) are preferred for devices that provide the most rapid responses. Aqueous electrolytes comprising at least about 4 M aqueous $H_2SO_4$ or 4 M aqueous KOH are especially preferred. Aqueous electrolytes comprising about 38 weight percent $H_2SO_4$ and electrolytes comprising above 5 M aqueous KOH are most especially preferred. For cases where a large device response range is more important than device response rate, electrolytes with large redox windows are preferred, since an increased voltage range increases the achievable device response range. Most preferred organic electrolytes include propylene carbonate, ethylene carbonate, butylene carbonate, diethyl carbonate, dimethylene carbonate, and mixtures thereof with salts such as $LiClO_4$, $LiAsF_6$, $LiPF_6$, $LiBF_4$, $LiCF_3SO_3$, $Li(CF_3SO_2)_2N$, and $Li(CF_3SO_2)_3C$.

Solid-state electrolytes can also be used advantageously, since such electrolytes enable all-solid-state devices. More preferred organic-based solid-state electrolytes are polyacrylonitrile-based solid polymer electrolytes (with salts such as potassium, lithium, magnesium, or copper perchlorate, $LiAsF_6$, and $LiN(CF_3SO_2)_2$). More preferred organic solvents for these solid-state and gel electrolytes include propylene carbonate, ethylene carbonate, γ-butyrolactone, and mixtures thereof. Preferred gel or elastomeric solid electrolytes include lithium salt-containing copolymers of polyethylene oxide (because of high redox stability windows, high electrical conductivities, and achievable elastomeric properties), electrolytes based on the random copolymer poly(epichloridrin-co-ethylene oxide), phosphoric acid containing nylons (such as nylon 6,10 or nylon 6), and hydrated poly(vinyl alcohol)/$H_3PO_4$. Other preferred gel electrolytes include polyethylene oxide and polyacrylonitrile-based electrolytes with lithium salts (like $LiCl)_4$) and ethylene and propylene carbonate plasticizers. The so called "polymer in salt" elastomers (S. S. Zhang and C. A. Angell, J. Electrochem. Soc. 143, 4047 (1996)) are also preferred for lithium-ion-based actuators, since they provide very high lithium ion conductivities, elastomeric properties, and a wide redox stability window (4.5–5.5 V versus $Li^+/Li$). Preferred electrolytes for high temperature actuators include ionic glasses based on lithium ion conducting ceramics (superionic glasses) (up to 250° C.), ion exchanged β-alumina (up to 1,000° C.), $CaF_2$, and $ZrO_2/Y_2O_3$ (up to 2,000° C.). Other preferred inorganic solid-state electrolytes are AgI, AgBr, and $Ag_4RbI_5$. Preferred inorganic molten salt electrolytes for high temperature actuators include alkali metal halides (such as NaCl, KCl, and mixtures of these salts) and divalent metal halides (such as $PbCl_2$). In some device applications it is desirable to use different electrolytes in different parts of the device. For example, the electrolyte that penetrates the carbon nanotube fiber, ribbon, or yarn can be different from the electrolyte that separates electrodes in the actuator. For instance, the electrolyte within the SWNT fiber can be a solid-state electrolyte that enhances the mechanical stress transfer between nanotubes, while a liquid electrolyte might be chosen for the inter-electrode space, so that high electrolyte conductivity of this electrolyte enhances the achievable rate performance.

Figure 10:
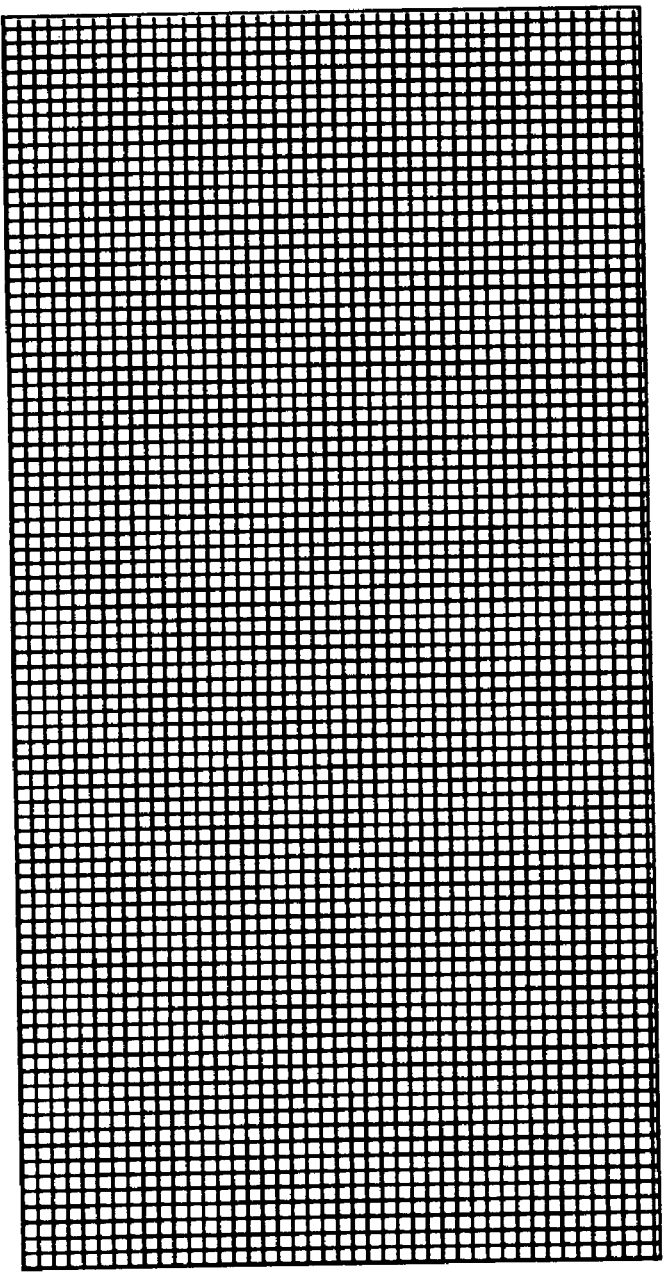
FIG. 10 shows a schematic of a woven article comprising ribbons of aligned carbon nanotubes produced by the improved coagulation spinning process and stabilized by heat treatment.

The presently demonstrated ability to spin substantially impurity-free nanotube fibers and ribbons means that these fibers or ribbons can be combined (either together or separately) using conventional fiber technology to make yarns and woven articles. FIG. 10 shows a schematic of a typical woven article of ribbons of aligned carbon nanotubes produced by the improved coagulation spinning process and stabilized by heat treatment. In instances where it is desirable to provide a setting of the nanotube structure, the annealing to eliminate the dimensional instability of the as-spun nanotube fibers is preferably accomplished after the nanotube fibers, ribbons, or yarns are woven, wound, or otherwise configured into the desired carbon-nanotube-containing article.

Fiber and or ribbons combined as yarns can be used to maximize the rate performance of electrochemical devices by minimizing the separation between the two electrodes (working and counter electrodes) that are required for these devices. This utilization of the fibers, ribbons or yarns produced by the coagulation spinning process can be accomplished by the following preferred invention embodiment: (1) impregnate two or more lengths of annealed CS nanotube fiber, ribbon or yarn with a solid-state electrolyte, such as phosphoric acid/poly(vinyl alcohol) including a continuous coating over the outer fiber or ribbon surface; (2) attach a working electrode contact to a fraction of these electrolyte-impregnated fibers, ribbons, or yarns, and counter electrode contacts to the remaining of these electrolyte-impregnated fibers, ribbons, or yarns; and (3) combine these working and counter-electrode nanotube elements (along with electrolyte that ionically connects these elements) in a geometry appropriate for the particular targeted device application. Examples of particularly preferred geometries are (a) a parallel, straight array of these elements in which the working electrode elements are interdispersed with the counter-electrode elements, most preferably so as to minimize average separation between electrode elements of different types, and (b) a wound array of these electrode elements obtained by winding the two or more electrode lengths simultaneously or sequentially onto a mandrel, thereby forming a hollow cylindrical body comprising two or more interpenetrating electrodes or two or more layered electrodes. For another preferred geometry, the two or more lengths of electrolyte impregnated and coated NT fiber, ribbon or yarn may be woven into a cloth comprising two or more interpenetrating electrodes. Electrical connections can be conveniently made in various ways, such as by weaving working and counter electrode elements in orthogonal directions in a woven cloth, so that separate electrical connections can be separately made and maintained for these directions.

These thereby configured electrode elements comprising carbon nanotube fibers, ribbons, or yarns can be used as various types of electrochemical devices. The most preferred of these devices are actuators and supercapacitors. Such use of nanotube fibers, ribbons, and yarns enables the multifunctional application of carbon nanotubes. For example, a soldiers vest woven from the above-described cloth could be used to provide both a structural function and an energy storage function (supercapacitor).

The unannealed CS spun filaments are can be more supple than they are in the heat treated state (especially if the unannealed fibers contain absorbed water) and in some cases it is found advantageous to postpone the annealing step until after winding, weaving or other lay-up steps. In this case, the electrolyte must be placed within the porous structure after heat treatment and insulating separators must be incorporated within the wound or woven structures. Such separators may comprise layers of glass or ceramic fiber or yarn wound or woven between the NT fibers. As in the case of the as spun fiber, ribbons, or yarns, the annealing temperature for wound or woven objects is preferably in the range of between about 200° C. and about 2100° C. and more preferably in the range of between about 400° C. and about 1200° C. In some cases the annealing step is advantageously carried out with the wound body or woven cloth in a state of tension. In this way, a closed-end wound cylindrical shell can be annealed using internal pressure to create a state of tension in the shell.

FIG. 11 shows a schematic of a wound article of ribbons of aligned carbon nanotubes produced by the improved coagulation spinning process and stabilized by heat treatment. Carbon nanotubes 22 are wound around a mandrel 23. The wound structure 24 can be removed from the mandrel 23 either before or after heat treatment.

The nanotube structure of the invention can be utilized for the storage of gases such as hydrogen. Carbon nanotubes are known to store hydrogen efficiently (M. S. Dresselhaus et al., MRS Bulletin 24, 45–50 (1999)) and the fiber or ribbon geometry is good for this application because it keeps the nanotubes in place (i.e., the nanotubes don't fly out with the hydrogen when the hydrogen is withdrawn from the storage vessel). The gas storage system can be an annular nanotube body made by winding the nanotube fiber or ribbon on a mandrel. This annular body would be contained in a cylindrical pressure vessel with a gas inlet/outlet port. An external or internal heater would be used for desorbing the stored gas.

The actuators enabled by the fibers, ribbons, and yarns of this invention may be used for the conversion of electrical energy to mechanical energy. The applications for these mechanical actuators are diverse and include, for example, robotic devices; high temperature air flow valves for aircraft engines; optical switches for optical fiber interconnects; adjustable structures for vibration suppression and failure avoidance; phase shifters for optical gyroscopes; precision electronic gyroscopes; and artificial muscles for space suits. These electromechanical actuators resulting from invention embodiments can provide (a) high-stress-generation capabilities, (b) high gravimetric and volumetric work capabilities per cycle, and (c) high volumetric and gravimetric power generation capabilities. Also, the actuators of the preferred embodiments can operate at low voltages, which provides savings in device electronics, avoids potential safety hazards, and minimizes electromagnetic interference effects.

The carbon nanotube fibers of invention embodiments can also be used for carrying high currents. This capability to carry high currents results from the combination of their reasonably high electrical conductivities and their high thermal conductivity and high thermal stability (enabling substantial heating and conduction of produced heat from the fibers). The invention embodiments that provides the NT fibers of this invention as windings on a mandrel (with optional heat set on the mandrel) enables a preferred use of the carbon nanotubes as motor windings, electromagnet windings, and the winding for transformers.

The following examples are provided to more particularly illustrate the invention, and should not be construed as limiting the scope of the invention.

EXAMPLE 1

This example demonstrates the successful use of coagulation spinning to produce long SWNT filaments that are substantially impurity free. The utilized HiPco nanotubes were made by the high-pressure carbon monoxide route described by R. E. Smalley et al. in International Application No. PCT/US99/25702. Characterization of this material by Raman spectroscopy showed a nanotube diameter of about 0.84 nm. A 15 g quantity of nanotube mixture, which contains 0.4% (0.060 g) of the HiPco SWNTs and 1.2% (0.18 g) surfactant in 98.4% (14.76 g) distilled water was prepared. The surfactant used was sodium dodecyl sulphate (SDS 151-21-3, purchased from ICN Biomedical, Aurora Ohio). The mixture was sonicated for about 15 minutes by BRANSON MODEL 350 20 kHz sonifier, purchased from Branson Ultrasonic Corporation, Danbury Conn. Sonication of the NT/surfactant/water mixture was accomplished in a 21 cc glass bottle (25 mm inside diameter), which was placed in a cold water bath in order to minimize sample heating during ultrasonication. The sonication (using the 12.7 mm diameter ultrasonic horn with the standard flat tip) was accomplished by inserting the tip of the sonicator a centimeter deep into the NT/surfactant/water mixture. The output control of the above sonifier was set to 3; the mode of operation was set to pulsed with the setting 0.7 sec on/0.3 sec off; the process timer was set to 15 min and the total estimated input power was 30 watts. The sonication step produced a stable, homogeneous colloidal suspension. For use as a coagulation bath, a 5% by weight solution of poly(vinyl alcohol) (PVA) was prepared by combining 50 g of Fluka PVA (molecular weight 49000, catalogue No 8138) with 950 g of distilled water, heating to 70° C. and mixing for about 2 hrs. This PVA solution was placed in a glass cylinder (100 mm in diameter and 50 mm high and fixed concentrically on rotating table. A stainless steel needle was used for injecting the spinning solution into the coagulation bath. This needle (purchased from Popper & sons, Inc., Cat. No. 7181, measuring 150 mm long, 0.80 mm O.D., 0.50 mm I.D.) was ground to obtain a flat and perpendicular exit end. The injection needle was bent so that the spinning ink could be injected parallel to the bath surface. The point of injecting the spinning ink was at a radius of 35 mm from the center of the cylindrical dish, about 10 mm under the surface of the PVA solution, and parallel to the dish bottom. The glass cylinder containing the PVA solution was rotated at 30 rpm. The employed rate of 1.67 ml/minute for injecting the spinning solution into the coagulation bath was achieved using a Model 200 series KD Scientific syringe pump with a 10.25 mm I. D. syringe. After laminar rotational flow was established, the syringe pump was activated and nanotube solution injected in a direction parallel to the established flow. The coagulation of nanotubes from the nanotube solution formed a continuous spiral ribbon inside the PVA solution. The ribbon was subsequently washed in water and dried in air to form nanotube filaments. The details of fiber washing and drying are as follows: The ribbon was carefully transferred from the PVA solution into a bath of distilled water and left there for 2 hrs with no stirring or agitation. This procedure was repeated five times, each time using a fresh bath of water. The washed ribbon was then attached to a metal hook and pulled out of the water at a rate of about 200 mm/hr. The resulting dried nanotube filament was essentially round in cross-section, with a diameter of about 0.050 mm.

EXAMPLE 2

The CS process of Example 1 was unsuccessful when the SWNTs used for the spinning solution were highly purified SWNTs obtained by the purification of carbon-arc-synthesized nanotube-containing soot. These purified carbon nanotubes were obtained from CarboLex, Inc, University of Kentucky, Lexington Ky. The nanotube suspension was prepared, sonicated and spun exactly as in Example 1. The spinning did not result in the formation of continuous ribbons or filaments. Rather, the injected stream of nanotube suspension broke up into short lengths upon injection into the PVA bath.

EXAMPLE 3

The CS process of Example 1 was unsuccessful when the SWNTs used for the spinning solution were highly purified SWNTs obtained by the purification of laser-evaporation produced nanotube-containing soot. These chemically purified carbon nanotubes were purchased from tubes@rice, Rice University and consisted predominately of nanotubes having a diameter of about 1.2 to 1.4 nm. The nanotube suspension was prepared, sonicated, and spun exactly as in Example 1. The spinning did not result in the formation of continuous ribbons or filaments. Rather, the injected stream of nanotube suspension broke up into short lengths upon injection into the PVA bath.

EXAMPLE 4

The CS process of Example 1 was unsuccessful when the SWNTs used for the spinning solution were chemically purified SWNTs obtained by the purification of material synthesized by catalytic decomposition of methane at 1000° C. over well-dispersed metal particles supported on zeolite. The nanotube suspension was prepared, sonicated and spun exactly as in Example 1. The spinning did not result in the formation of continuous ribbons or filaments. Rather, the injected stream of nanotube suspension broke up into short lengths upon injection into the PVA bath.

EXAMPLE 5

The following provides a further example of the spinning of carbon nanotubes that are substantially free of carbonaceous impurities and have outstanding modulus and strength compared with prior-art nanotube fibers. The obtained modulus (25 GPa) is about 25 times higher than normally obtained for sheets of carbon nanotubes and about twice the highest modulus of carbon nanotube fibers spun by the prior-art technology. One reason for this major improvement in mechanical properties is believed to be the present use of a special spinning nozzle that is designed to increase nanotube alignment in the spun fibers. Except for the following features, the spinning solution and spinning method were the same as for Example 1. As an improvement on the process of Example 1, following sonication, the spinning solution was filtered twice through two layers of metal mesh that had a 25 mm diameter and 0.025 mm openings. The advantage of using this filtration procedure was to eliminate non-dispersed clumps of nanotubes that survived the sonication process, which produced occasional irregularities in the fiber produced in Example 1. In addition, a shear-flow injection nozzle with conical cross-section (see FIG. 4) was fitted over the end of the injection needle. The part of the nozzle in contact with solution had the following dimensions: a 0.84 mm entrance diameter, a 0.38 mm exit diameter, and a 7.62 mm length. Other changes from Example 1 were as follows: The coagulation was rotated at a higher rate of 50 rpm, and the washing of the coagulated ribbon was for 16 hours in a bath of distilled water. The dried fiber drawn from the water bath was essentially round and had a cross-sectional diameter of 0.03 mm. The measured modulus of the dry fiber was 25 GPa, the ultimate strength at break was 273 GPa, and the strain to break was about 6%.

EXAMPLE 6

This example demonstrates the instability of as-spun fibers in an aqueous electrolyte and the use of thermal annealing to eliminate this instability. It also demonstrates the high extensional elastic modulus of fibers coagulation spun from HiPco nanotubes, compared to high quality bucky paper (whose elastic modulus is typically about 1 GPa). The fiber was spun from aqueous suspension containing 0.4% nanotubes and 1.2% SDS by the process described in Example 1. After spinning, the fiber was washed in water and dried by slow pulling from the water bath. The cross-sectional area of the prepared fiber ranged from 0.0005 to 0.0026 $mm^2$ as determined by optical microscopy. The heat treatment of the material was performed in a titanium gettered flowing argon atmosphere tube furnace at a temperature of 1080° C. for 1 hour. Measurements of the stress-strain dependencies and Young modulus were carried out at ambient conditions using a Seiko Instruments Dynamic Load Thermomechanical Analyzer TMA/SS120C. Two runs were taken on the same fiber for both as prepared and annealed materials. First, the fiber was tested in air and the data on dry modulus were obtained. Then the fiber, while still attached to the TMA sample holder, was put in deionized water, kept wet for 10 minutes and measured for a second time. The second run provided data on wet modulus. The results of the measurements are summarized in Table 1.

TABLE 1

Modulus results.

| Material | Dry Modulus (GPa) | Wet Modulus (GPa) |
|---|---|---|
| As prepared fiber | 16.8 | 0 |
| Annealed fiber | 11.2 | 7.1 |

The as-prepared fiber readily absorbs water and swells to several times its dry state diameter. Because of the swelling in wet state the fiber elongates and looses its integrity under any minor load. The wet modulus for the as-prepared fiber was below the sensitivity of our machine and is close to zero. The thermal annealing eliminated the swelling that resulted in this essentially complete loss of modulus in water or in an aqueous electrolyte. Annealing of the as-spun fibers at 100° C. for one hour did not eliminate swelling in fiber diameter and the loss of mechanical properties when the fibers were immersed in water. These 100° C. annealed fibers doubled in diameter when immersed in water. However, annealing the as-spun fibers at 200° C. for one hour resulted in annealed fibers that changed diameter by less than 10% when immersed in water.

EXAMPLE 7

This example illustrates the typical electromechanical response (force generation capability) of thermally annealed, coagulation-spun nanotube fiber in aqueous 1 M NaCl electrolyte. This response shows that these thermally annealed, coagulation-spun fibers can be used in actuator applications, and in other electrochemical applications that require a high surface area. Because of the instability of prior-art CS nanotube fibers, these fibers could not be used for electrochemical applications. The fiber used for testing was prepared by the spinning process described in Example 1 and annealed at 1080° C. temperature as outlined in Example 6. The cross-sectional area of the fiber determined by optical microscopy was equal to 0.0013 $mm^2$. The electrochemically-generated force in these fibers was measured using a sensitive force transducer similar to the one used in a high precision analytical balance. The measured force change was normalized by the cross-sectional area of fiber to provide the actuator-generated stress. The fiber (attached to an arm of the force transducer) was put in aqueous 1 M NaCl solution, stretched under a constant stress of 4 MPa and subjected to a periodic potential at a frequency of 0.03 Hz. The potential (measured versus saturated calomel electrode, SCE) was a square wave potential, which was applied using a Gamry Instruments PC4 Potentiostat. The nanotube fiber and a Pt mesh acted as the working and counter electrodes, respectively. The typical electromechanical response of the fiber, recorded at voltage amplitude of 1V vs SCE, is shown in the left panel of FIG. 2. The response follows the waveform of the applied electric potential with a stress amplitude of 2.1 MPa corresponding to a potential change of 2V (from 1V to −1V). The stress amplitude was found to be proportional to the voltage amplitude with the slope of the dependence being about 0.9 MPa/V, as shown in the right panel of FIG. 2.

EXAMPLE 8

This example illustrates the dramatically increased range of spinable compositions that result for the invention embodiments employing the HiPco nanotubes. As shown in FIG. 3, it was possible to spin fibers over the nanotube composition range of at least 0.2 to 0.5% and surfactant concentrations between as least as low as 0.6% to at least as high as 3%.

It is to be understood that the foregoing descriptions and specific embodiments shown herein are merely illustrative of the best mode of the invention and the principles thereof, and that modifications and additions may be easily made by those skilled in the art without departing for the spirit and scope of the invention, which is therefore understood to be limited only by the scope of the appended claims.

What is claimed is:

1. A process of making a continuous ribbon or filament structure containing carbon nanotubes which comprises:

forming a uniform suspension in a liquid of single-wall carbon nanotubes made at a pressure of at least 10 atm from carbon monoxide, the nanotubes having an average diameter in the range of about 0.6 nanometers to about 0.9 nanometers and being free of carbonaceous contaminants;

coagulation spinning the suspension to form the structure;

submitting the structure to tension; and annealing the structure under a state of tension at an annealing temperature or temperatures sufficient to stabilize the structure against swelling and loss of mechanical strength upon immersion in water or other liquid.

2. The process of claim 1, wherein the structure is a fiber, ribbon or yarn.

3. The process of claim 1, wherein the maximum annealing temperature is between about 200° C. and about 2100° C.

4. The process of claim 1, wherein the maximum annealing temperature is between about 400° and about 1200° C.

5. The process according to claim 1, wherein a diameter distribution of the carbon nanotubes is bimodal with a first peak centered in the range of about 0.6 nm to about 0.9 nm and a second peak at a larger diameter in the range of about 1.0 nm to about 2.0 nm.

6. The process of claim 1, wherein the annealing is performed after a step of weaving or winding the structure.

7. The process of claim 1, wherein either the tension is between about 10 MPa to about 300 MPa or the structure is maintained at substantially constant length.

8. The process of claim 1, wherein the annealing is performed in inert or reducing atmosphere and a maximum annealing temperature is above about 600° C.

9. The process of claim 1, wherein the annealing is performed in an atmosphere of steam.

10. The process of claim 1, wherein the step of coagulation spinning is performed using a shear-flow-inducing nozzle.

11. The process of claim 1, wherein the suspension of carbon nanotubes comprises a surfactant, water, and nanotubes synthesized by metal-particle-catalyzed disproportionation of carbon monoxide.

12. The process of claim 11, wherein the surfactant is sodium dodecyl sulfate.

13. The process of claim 1, wherein the coagulation spinning occurs in a polymer containing solution.

14. The process of claim 13, wherein the polymer in the polymer containing solution is poly(vinyl alcohol).

15. A process of coagulation spinning of a fiber, ribbon, or yarn, which comprises:

providing a first liquid comprising a uniform dispersion of single-wall-carbon nanotubes; and injecting the first liquid as a jet into a second coagulation liquid, the jet being formed in an orifice of decreasing diameter, which creates a converging flow field at close to the point of injection into the second coagulation liquid.

16. The process of claim 15, wherein the jet is formed in an orifice which has a cross section that is neither round, elliptical, square, or rectangular.

17. The process of claim 15, wherein the jet is injected from a tubular channel of decreasing diameter into an annular stream of the second coagulation liquid that flows coaxial with and surrounding the jet.

18. The process of claim 17, wherein a major proportion of the coaxially flowing coagulation solution is removed through a section of porous wall flow tube located downstream of the converging flow field.

19. The process of claim 18, wherein two or more liquid streams, which each contain a nanotube structure in the coagulation liquid, are combined into a single flow stream containing two or more nanotube structures.

20. The process of claim 15, wherein the carbon nanotubes are free of carbonaceous impurities and the average diameter of the single-wall carbon nanotubes is in the range of about 0.6 nm to about 0.9 nm.

21. The process of claim 15, wherein the second coagulation liquid contains a polymer.

22. The process of claim 21, wherein said polymer is poly(vinyl alcohol).

23. The process of claim 15 that further includes annealing the fiber, ribbon, or yarn at a maximum annealing temperature of between about 200° C. to about 2100° C.

* * * * *